Patented Feb. 17, 1942

2,273,687

UNITED STATES PATENT OFFICE 2,273,687

DIACYLAMINO-1,3,5-TRIAZINES

Louis H. Bock, Glenside, and Alva L. Houk, Philadelphia, Pa., assignors to The Resinous Products & Chemical Company, Philadelphia, Pa.

No Drawing. Application October 21, 1939, Serial No. 300,549

12 Claims. (Cl. 260—248)

This invention relates to diacylamino-1,3,5-triazine derivatives and to a process for making them from aliphatic carboxylic acids and dicyandiamide.

It has been found that when an aliphatic carboxylic acid and dicyandiamide are mixed and heated together, they react to give a diacylamino-1,3,5-triazine, the yield varying with the particular acid chosen. In place of an aliphatic acid there may be used its anhydride. After the reaction has been started, it is desirable to control the reaction by external cooling, since the reaction is exothermic. Stirring is also helpful in obtaining a smoother and more complete reaction. After the initial reaction has occurred, the reaction mixture may be heated until there is no apparent further reaction, as shown by cessation of liberation of gas. The period of heating should usually be from one-half hour to eight hours, depending on the particular reactants and the temperature at which the reaction mixture is heated which may vary between 80° and 250° C. The condensation products may then be separated in most cases from unreacted materials and by-products. The most convenient method for accomplishing the separation is by taking up the condensation products in a solution of an alkali hydroxide and then precipitating them by neutralization with acid. Reaction products from higher fatty carboxylic acids may then be further purified by extraction with a solvent such as alcohol, followed by crystallization.

The reaction of an aliphatic carboxylic acid and dicyandiamide does not require the addition of a condensing agent, as during the reaction ammonia is formed and volatilized. If desired, condensing agents such as acid clays may be used without, however, any essential change in the course of the reaction. The result of the reaction is to form several types of products, from which there can be separated a diacyl ammeline corresponding to the formula:—

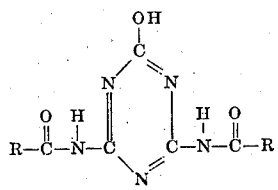

or a tautomer, such as

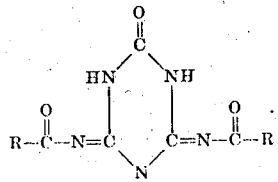

wherein R represents hydrogen or an aliphatic organic radical. It appears theoretically that the acid and dicyandiamide may combine to form an addition product, two molecules of which should then combine with the elimination of urea and ammonia. It is actually found that ammonia is liberated in the reaction and ammelide, known to be formed by heating urea, has been separated from reaction products.

It has been found that any aliphatic carboxylic acid of the formula R—COOH, wherein R represents hydrogen or an aliphatic residue, will react with dicyandiamide. There is apparently nothing critical as to the proportions of acid (or acid anhydride) and dicyandiamide which are required, substituted triazines being formed essentially to the full extent of the minor component in a mixture containing non-equivalent amounts of reactants. There may be used saturated or unsaturated acids, straight or branched chain acids, such as formic, acetic, propionic, isobutyric, caproic, stearic, or higher fatty acid, crotonic, undecylenic, oleic, linoleic, or lithofellic acid, or succinic acid, phenylacetic acid, etc., or commercial mixtures of acids, such as cocoanut fatty acids, etc., and acids containing additional functional groups, such as ether acids, hydroxy acids, amino acids, etc. Acids containing two reactive groups, particularly two dissimilar reactive groups, as in aminoacetic or chloroacetic acids, give reaction products, some of which are resinous in nature and interfere with purification. There may also be used, as has been indicated above, acid anhydrides, such as acetic anhydride, maleic anhydride, etc. Reactions involving anhydrides are somewhat difficult to control and the products obtained therefrom are not readily isolated or separated because of the formation of tars or resins.

The condensation products as obtained and the purified products as well are useful in a great number of applications. Either type of material may be used in textile manufacture as assistants for wetting, emulsifying, dyeing, etc., when the group added to the triazine nucleus contains at least four carbon atoms and soap-like properties are thus at hand. The diacylamino-1,3,5-triazines may also find use as bactericides, insecticides, and as intermediates for the preparation of dyestuffs, pharmaceuticals, and industrial products.

The following examples illustrate the preparation of aliphatically substituted triazines by the method which has been described above.

Example 1

A mixture of 46 g. of formic acid and 84 g. of dicyandiamide was stirred and warmed gradually to 100° C. An exothermic reaction took place and the temperature of the mixture was kept between 100 and 115° C. by external cooling. Finally the mixture set to a solid mass. It was dissolved in 10% sodium hydroxide, and neutralized with hydrochloric acid. A white precipitate formed which was filtered and washed with water. When dry, its melting point was above 250° C. The product was a mixture, of which the acyl substituted ammeline formed a considerable part.

Example 2

A mixture of 84 g. of dicyandiamide and 60 g. of acetic acid was refluxed until the reaction mixture was completely solid. It was extracted with dilute sodium hydroxide and precipitated by neutralizing with hydrochloric acid. After being washed well with water and dried, it contained by analysis 32.8% nitrogen and melted above 250° C. The product was chiefly $C_7H_9O_3N_5$ (N, 33.1%), a small amount of other products being present.

Example 3

A mixture of 284 g. of stearic acid and 84 g. of dicyandiamide was stirred 4 hours at 140° C. The product was crystallized from alcohol. 125 g. of product melting at 108-112° C. was obtained. A portion recrystallized melted at 115-121° C. having 10.18% nitrogen by analysis, ($C_{39}H_{73}O_3N_5$; N, 10.62%). This material is chiefly distearyl ammeline. Upon careful separation and extraction of this material, a small amount of a product melting at 212-218° C. was obtained. This contained by analysis 16.1% nitrogen ($C_{20}H_{36}ON_4$; N, 16.09%), which is believed to be 2-heptadecyl-4-amino-6-hydroxy-1,3,5-triazine.

Example 4

A mixture of 140 g. of oleic acid and 42 g. of dicyandiamide was stirred and heated slowly to 180° C. and maintained at that temperature for three hours. It was then cooled and refluxed with methanol and filtered while hot to remove insoluble by-products. From the filtrate the following fractions of crystals were obtained. Fraction No. 1, 11.5 g., analysis showed N, 15.78%. Fraction No. 2, 6.5 g., analysis showed N, 15.30%. Fraction No. 3, 20.5 g., analysis showed N, 10.38%. Fraction No. 3, which was a waxy solid, corresponds to the dioleyl ammeline, the theoretical nitrogen content of which is 10.68%.

Example 5

A mixture of 56 g. of acetic anhydride and 84 g. of dicyandiamide was stirred and heated to 140° C. A vigorous reaction occurred and the product became solid. It was dissolved by warming with 400 g. of 10% sodium hydroxide. It was then neutralized with hydrochloric acid. A yellow precipitate formed which was washed and dried. Analysis: N, 40.46%. The theory for diacetyl ammeline is 33.1% N. The product is apparently a mixture containing 35% of the diacetyl compound.

Example 6

A mixture of 126 g. of oxalic acid and 84 g. of dicyandiamide was stirred and heated to 100° C., whereupon it reacted and set to a solid mass. This was extracted with sodium hydroxide and neutralized with hydrochloric acid. A solid was obtained analyzing 46.3% nitrogen. It was crystallized from water. The crystals showed by analysis 37.47% nitrogen. The product was obviously a mixture.

Example 7

A mixture of 92 g. of chloroacetic acid, 84 g. of dicyandiamide, and 300 g. of toluene was heated to refluxing. A vigorous reaction set in and a solid, vitreous material separated. This was dissolved by warming with dilute sodium hydroxide. Upon neutralization of this solution, a slight amount of dark colored solid was obtained. According to the analytical data chlorine is present in the compound and nitrogen constitutes 25.36% of the product. The theory for di(chloro acetyl) ammeline is 25.0% nitrogen.

We claim:

1. The process of preparing diacyl-substituted amino-hydroxy-1,3,5-triazine which comprises heating a mixture of reactants consisting essentially of a member of the group consisting of aliphatic carboxylic acids and aliphatic carboxylic acid anhydrides and dicyandiamide until reaction starts and thereafter heating the mixture until the reaction between said reactants is substantially complete.

2. The process of preparing diacyl-substituted amino-hydroxy-1,3,5-triazines which comprises heating a mixture of reactants consisting essentially of a member of the group consisting of aliphatic carboxylic acids and aliphatic carboxylic acid anhydrides and dicyandiamide until reaction starts, thereafter maintaining the mixture below 250° C. until the reaction between said reactants is substantially complete, and separating the resulting products.

3. The process of preparing diacyl-substituted amino-1,3,5-triazines which comprises heating a mixture of reactants consisting essentially of dicyandiamide and a monobasic aliphatic carboxylic acid until reaction starts and thereafter maintaining the temperature of the reaction mixture between about 80° C. and about 250° C. for a period of time between eight hours and one-half hour.

4. The process of preparing diacyl-substituted amino-1,3,5-triazines which comprises heating a mixture of reactants consisting essentially of dicyandiamide and a monobasic aliphatic carboxylic acid until reaction starts and thereafter maintaining the temperature of the reaction mixture between about 80° C. and about 250° C. for a period of time between eight hours and one-half hour, and separating the resulting products.

5. The process of preparing diacyl-substituted amino-1,3,5-triazines which comprises heating between 80° and 250° C. a mixture of reactants consisting essentially of about one molecular proportion of an aliphatic carboxylic acid and between one and two molecular proportions of dicyandiamide until the reaction between said reactants is substantially complete.

6. The process of preparing diacyl-substituted aminohydroxy-1,3,5-triazines which comprises heating together between 80° C. and 250° C. about one molecular proportion of a higher fatty acid and between one and two molecular proportions of dicyandiamide.

7. The process of claim 6 in which the fatty acid is stearic acid.

8. The reaction mixture obtained by the condensation by heating within the temperature range of about 80° C. and about 250° C. an aliphatic carboxylic acid with dicyandiamide in the substantial absence of water.

9. The reaction mixture obtained upon condensing by heating within the temperature range of about 80° C. and about 250° C. dicyandiamide with a member of the group consisting of aliphatic carboxylic acids and aliphatic carboxylic acid anhydrides in the substantial absence of water.

10. A compound having, in one of its tautomeric forms, the formula

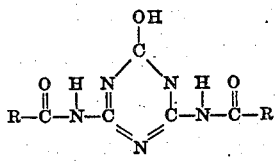

wherein R represents a member of the group consisting of hydrogen and aliphatic radicals.

11. A compound having in one of its tautomeric forms the formula

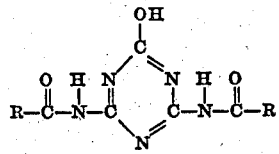

wherein R represents the hydrocarbon radical from a higher fatty acid.

12. A compound having in one of its tautomeric forms the formula

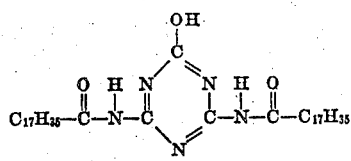

LOUIS H. BOCK.
ALVA L. HOUK.